United States Patent [19]

Rigamonti et al.

[11] Patent Number: 5,569,498
[45] Date of Patent: Oct. 29, 1996

[54] PROCESS FOR THE PREPARATION OF SHAPED ARTICLES BASED ON ACRYLIC POLYMERS COATED WITH AN ANTISCRATCH AND ANTIABRASION FILM

[75] Inventors: Marco Rigamonti; Donato Stanco, both of Milan, Italy

[73] Assignee: Atohaas Holding, C.V., Haarlem

[21] Appl. No.: 463,637

[22] Filed: Jun. 6, 1995

[30] Foreign Application Priority Data

Sep. 2, 1994 [IT] Italy ................................. MI94A1811

[51] Int. Cl.⁶ ......................................................... B05D 3/06
[52] U.S. Cl. .......................... 427/495; 427/519; 427/493
[58] Field of Search .................................... 427/519, 517, 427/495, 493

[56] References Cited

U.S. PATENT DOCUMENTS

| | | | |
|---|---|---|---|
| 4,156,035 | 5/1979 | Tsao et al. | 427/44 |
| 4,227,978 | 10/1980 | Barton | 204/159.12 |

FOREIGN PATENT DOCUMENTS

| | | |
|---|---|---|
| 2096343 | 3/1993 | Canada . |
| 335629 | 10/1989 | European Pat. Off. . |
| 0442305 | 8/1991 | European Pat. Off. . |
| 571808 | 12/1993 | European Pat. Off. . |
| WO82/00782 | 3/1982 | WIPO . |

*Primary Examiner*—Michael Lusignan
*Assistant Examiner*—Erma Cameron
*Attorney, Agent, or Firm*—Burns, Doane, Swecker & Mathis, L.L.P.

[57] ABSTRACT

The invention refers to a process to render antiscratch and antiabrasion shaped articles based on thermoplastic acrylic polymers consisting in coating the article by a composition comprising (A) 55–95% by weight of at least a (meth)acrylic monomer and/or oligomer having at least two double bonds;

(B) 5–25% by weight of monomers and/or oligomers of divinylethers and/or epoxides (C) 0–20% by weight of monomers and/or oligomers containing polar groups of monofunctional (meth)acrylaytes and/or monovinylethers, when (A) or (B) do not contain polar groups, and comprising a mixed system of photo-initiators of radical and cationic type, then in submitting the coated article to U.V. irradiation, at temperatures of 30°–70° C. to polymerize and crosslink the coating in situ.

12 Claims, No Drawings

PROCESS FOR THE PREPARATION OF SHAPED ARTICLES BASED ON ACRYLIC POLYMERS COATED WITH AN ANTISCRATCH AND ANTIABRASION FILM

The present invention relates to a process to render anti-scratch and abrasion-resistant the surface of shaped articles, plates and films based on thermoplastic acrylic polymers by coating with a mixture comprising a) (meth)acrylic monomers and/or oligomers having at least two polymerizable double bonds
b) vinylethers or epoxy monomers and/or oligomers and
c) cationic photoinitiators in combination with radicalic photoinitiators, which is subsequently polymerized and crosslinked in situ by UV radiation.

The invention relates, moreover, to antiscratch and abrasion-resistant shaped articles obtained by the aforesaid process.

It is known that one of the problems met in the use of plates and films, in particular the transparent ones, based on thermoplastic acrylic polymers, such as, for instance polymethylmethacrylate (PMMA), is due to their easy scratching and abrasion with consequent decrease of their transparence and decay of the surface aspect.

The art has suggested various surface treatments of plates and shaped articles of thermoplastic polymers, among which acrylic polymers, in order to avoid the aforesaid inconvenience.

Such treatments generally comprise the application on the article or on the thermoplastic plate (substrate) of a layer of monomers, generally acrylic, which was polymerized and crosslinked in situ by heating at high temperatures, from 80° C. to the Tg of the substrate, in the presence of radical polymerization initiators.

A polymerized and crosslinked coating of sufficient hardness improving the abrasion resistance of the thermoplastic article was obtained in this way.

However such treatments were not free from inconveniences, as they had to be carried out in oxygen-free environment, in particular under an inert atmosphere (nitrogen) in order to avoid inhibition due to oxygen on the polymerization and crosslinking carried out at high temperatures and degradation of the polymeric substrate with formation, besides, of undesired yellowish coloring. Moreover, the so obtained coatings did not always show a good adhesion to the substrate and a good transparence.

It resulted therefore difficult and complex to carry out said treatments in absence of oxygen, in particular in industrial plants for the continuous manufacture of plates and films of thermoplastic polymers.

There were moreover suggested treatments wherein the monomeric layer applied on the polymeric substrate was polymerized and crosslinked by using UV rays in the presence of photoinitiators, which could be carried out in room conditions, i.e. in the presence of air and at relatively low temperatures, such as not to affect the dimensional stability of the polymeric substrate, as well its mechanical, aspect and transparence properties, or, anyway, to avoid degradation thereof.

A process of this kind is described in Italian patent application MI94/A001014, in the name of the Applicant, wherein polymethylmethacrylate (PMMA) articles and plates are coated with a monomeric composition comprising a) (meth) acrylic monomers and/or oligomers having at least two polymerizable double bonds, b) (meth) acrylic monomers and/or oligomers containing polar groups and c) a radical photoinitiator and wherein said composition is subsequently polymerized and crosslinked in situ at UV light, at temperatures of 20°–65° C.

However such a process in not free from inconveniences due to the formation of crazes in the coating film that can also cause the subsequent breaking of the film itself.

In particular these phenomena occur especially when the formulation is spray applied on surfaces having a complex structure and for relatively high thicknesses of about 20–30 µm.

On the line of such a process it has now further and unexpectedly found that it is possible to avoid the formation of crazes in the antiscratch and antiabrasion coating film by using in the coating composition, besides (meth)acrylic monomers and/or oligomers having at least two polymerizable double bonds and containing polar groups, also monomers and/oligomers of divinylethers and/or epoxides and by using an hybrid system of UV photoinitiators comprising both radicalic and cationic photoinitiators.

By this improved process, object of the present invention, articles of acrylic polymers are obtained which are coated with a film showing a good adhesion to the polymeric substrate, having high antiscratch and antiabrasion properties, which does not show crazes and lasts in time without its possible breaking occurs.

Moreover, acrylic articles, in particular the transparent ones such as PMMA, coated according to the present invention, subtantially maintain unchanged their mechanical properties and their transparence without unwished yellowish coloring occurs.

Object of the present invention is therefore a process for preparing shaped articles, plates and films based on acrylic thermoplastic polymers, coated with an antiscratch and abrasion-resistant film, consisting in applying on the surface of said article an homogeneous layer of a mixture comprising:

(A) from 55 to 95% by weight of at least a (meth)acrylic monomer and/or oligomer having at least two polymerizable double bonds,
(B) from 5 to 25% by weight of monomers and/or oligomers of divinylethers and/or epoxides,
(C) from 0 to 20% by weight of monofunctional (meth) acrylic monomers and/or oligomers and/or monovinylethers, containing at least a polar group,
(D) from 0.B to 6 parts by weight for 100 parts of (A)+ (B)+(C) of a radicalic photoinitiator,
(E) from 0.1 to 3 parts by weight per 100 parts of (A)+(B)+ (C) of a cationic photoinitiator,
(F) from 0 to 8 parts by weight per 100 parts of (A)+(B)+(C) of colloidal silica or hydrophilic colloidal metal oxides, with the proviso that the sum of the amounts (A)+(B)+(C) is 100, and that when the component (A) or component (B) does not contain at least a polar group the component (C) is always present, and in submitting the article so coated to UV radiation at temperatures from 30° to 70° C.

As acrylic polymers forming the shaped article to be coated one can use for instance (co)polymers, generally transparent, of $C_1$–$C_4$ alkyl esters of (meth)acrylic acid, in particular polymethylmethacrylate (PMMA), transparent alloys of said (co)polymers with polyvinylchloride or polyvinylidenefluoride, and shock resistant polymethylmethacrylate containing in dispersed phase acrylic elastomers.

Monomers and/or oligomers of polyfunctional (meth) acrylates, for instance of glycols, polyols, polyethoxylated polyols and of aliphatic urethanes can be utilized as components (A).

Examples of such compounds are poly(meth)acrylated urethanes obtained by reaction of polyols with isocyanates and hydroxyethyl (meth) acrylates, pentaerythrite triacrylate (PETIA), pentaerythrite tetracrylate (PETTA), dipentaerythrite pentacrylate, 1,6-hexandiol diacrylate (HDDA), trimethylolpropane triacrylate (TMPTA), tripropylene glycoldiacrylate (TPDGA).

The aliphatic hexacrylate urethane and the pentaerythrite triacrylate and their mixtures with HDDA, TMPTA, TPGDA have proved to be particularly suitable.

Divinylethers, such as for instance, triethyleneglycoldivinylether and 1,4-cyclohexane dimethanoldivinylether and aliphatic epoxides, preferably cycloaliphatic, monomers or oligomers can be used as components (B).

Hydroxyalkyl (meth) acrylates and carboxyalkyl (meth) acrylates, such as, for instance, 2-hydroxyethyl(meth)acrylate, 2-hydroxypropyl (meth) acrylate, 2-carboxyethylacrylate and monovinylethers containing at least a carboxyl or hydroxyl group such as for instance butandiol monovinylether can be used as components (C) containing at least a polar group, preferably hydroxyl and/or carboxyl.

The presence of components (C) is not necessary when components (A) and (B) contain at least a polar group, as in the case component (A) is PETIA containing an hydroxyl group, however also in this case they can be used at low levels due to their diluent and viscosity reducing power for the mixture, especially if used with urethane-acrylates.

As components (D) can be used radical polymerization and crosslinking initiators at UV light known in the art, such as for instance 2-hydroxy-2-methyl-1-phenyl-propan-1-one- (DAROCURE-1173® of Ciba-Geigy), 1-hydroxy-cyclohexyl-phenyl-ketone (IRGACURE-184® of Ciba-Geigy) and those based on benzophenone such as for instance ESACURE KIP 100 E® of Fratelli Lamberti, or their mixtures.

As components (E) polymerization and crosslinking cationic initiators at UV light known in the art can be used, such as for instance triarylsulphonium salts such as triarylsulphonium hexafluoroantimonates (UVI-6974-CYRACURE®, Union Carbide) and triarylsulphonium hexafluorophosphates (UVI-6990-CYRACURE®, Union Carbide).

Such cationic photoinitiators are not inhibited by oxygen and are used in combination with radicalic photoinitiators (D) preferably in a weight ratio (D) / (E) of at least 2/1, more preferably 3/1.

By using such ratios it is possible to obtain crosslinking of the coating mixture in an air room with relative humidity up to 60%.

Component (F) is generally used in small amounts, preferably of 0.1–1% by weight, as viscosity regulator of the coating mixture; to this purpose colloidal silica having a diameter of the primary particles lower than 20 nanometers and a pH of 3–4, resulted particularly suitable.

Small amounts of UV stabilizers and levelling and fluidifying agents, such as non ionic surfactants, can also be added, before the UV crosslinking, to the coating mixture.

The UV stabilizers, in amounts up to 8% by weight, serve to protect the polymeric substrate during both crosslinking of the coating via UV and after the film formation.

They are generally consisting of benzotriazols and by sterically hindered amines such as, for instance TINUVIN 1130® and TINUVIN 292® of Ciba Geigy.

Non ionic surfactants, in amounts up to 3% by weight serve as fluidifying agent, especially if the mixture (A)+(B)+(C) results of little fluidity, in order to eliminate the spreading defects of such mixture and so improve the aesthetic aspect of the coating film.

Fluoroaliphatic polymeric esters, such as FC-430® of 3-M are particularly suitable to this purpose.

Organic solvents are not used in the process.

The coating mixture, being its viscosity adjustable at will by varying the percentage of components (A)+(B)+(C), by the use of colloidal silica and/or of fluidifying non ionic surfactants, can be applied on the substrate with anyone of the methods known in the art, for instance by spraying, spreading, so as to form an homogeneous coating layer capable of forming, after polymerization and UV crosslinking, a coating film having a 0.5–40 µm thickness, preferably from 5 µm to 15 µm.

Films having high thicknesses generally result more rigid and less flexible.

The temperatures at which polymerization and crosslinking of the layer of the coating mixture is carried out can vary from 30° to 70° C., preferably from 40° to 60° C., i.e. far from the PMMA glass transition (103° C.) and from the one of transparent materials having a PMMA matrix. The used monomers must have a boiling temperature higher than the PMMA substrate Tg and at least 60° C. higher than the crosslinking temperature. The film hardening lasts significatively even two days since crosslinking by UV radiation has been carried out if one is careful to keep the manufactured article in a room with relative humidity lower than 55%.

It is not necessary to operate in anaerobic room, however it is advisable to operate in a room with relative humidity lower than 60%.

The process according to the present invention can be carried out continuously, integrated with the preparation, for instance by filming and extrusion, of the support shaped article.

More particularly the present process can be continuously carried out, on a line of extrusion of polymethylmethacrylate plates in areas wherein the temperature is clearly lower than the Tg of such polymer (103°–108° C.) and i.e. around a range of temperatures of 60°–70° C.

In order to avoid overheating of the plate, due to the infrared component of the UV radiation emitted from UV lamps commonly used for polymerizing and crosslinking the coating, one can utilize UV lamps having a reduced infrared emission or placing between the UV lamp and the plate a filter eliminating most of infrared radiations, such as for instance a PYREX® glass of a 1–3 mm thickness and/or utilize a flow of cold gas (air and/or nitrogen) to maintain the system within the temperature limits indicated above.

A further object of the present invention are shaped articles, plates and films based on thermoplastic acrylic polymers having an antiscratch and abrasion-resistant coating, obained by the process of the present invention.

The shaped articles coated according to the process of the present invention show high antiscratch and abrasion resistance properties, an optimal adhesion of the coating film to the acrylic substrate, maintain unchanged their original transparence, their mechanical characteristics and the coating film does not show crazes which can even cause after some time the breaking of the film itself.

In order to verify the effectiveness of both antiscratch and antiabrasion treatment, two distinct methods have been used, since the two properties are distinguishable.

To measure the scratch resistance, the hardness test has been used with wood pencils according to ASTM D 3363.

To measure the abrasion resistance it has been adopted the method by falling of powder of silicon carbide on the treated plate and the consequent loss of transparency has been measured according to ASTM D 673.

The adhesion of the film to the support was determined by applying on the film an adhesive tape type 610 (3 M) according to ASTM 3359 standard.

Optical tests have been carried out to verify the effectiveness of the antiabrasion and antiscratch paints.

Light transmittance and turbidity tests have been carried out according to ASTM D 1003.

The yellow index has been determined according to ASTM D 1925.

Some examples are given for illustrative purposes.

EXAMPLE 1

A PMMA plate of a 3 mm thickness was coated by spreading with a layer of 10 μm of a mixture containing 50 parts by weight of aliphatic hexacrylate urethane (EB 1290, UCB), 25 parts of 1,6 hexandiol diacrylate (HDDA), 15 parts of triethyleneglycol divinyl ether and 15 parts of pentaerythrite triacrylate.

2.5 parts by weight of radicalic photoinitiator (DAROCURE 1173®, Ciba Geigy) and 0.8 parts by weight of cationic photoinitiator (UVI-6990 CYRACURE® Union Carbide) are added to such solution.

The formulation was polymerized with a 120 W/cm UV lamp at a feeding rate of 2 m/min. The substrate temperature did not exceed 60° C. The crosslinked film showed an optimal adhesion on the PMMA plate.

Pencil hardness and abrasion tests (mar resistance) were carried out two days after the film spreading and crosslinking on the PMMA substrate.

The pencil hardness was 7 H (untreated PMMA=HB) and an haze of about 5% after the falling of two thousand grams of silicon carbide (untreated plate=11.5).

The yellow index remained unchanged and the film did not show the presence of crazes.

EXAMPLE 2

A PMMA plate of a 3 mm thickness was coated by spraying with a 10 μm layer of a mixture containing 60 parts by weight of trimethylolpropane triacrylate, 25 parts by weight of pentaerythrite triacrylate and 15 parts by weight of 1,4 cyclohexane dimethanol divinyl ether. 2.5 parts by weight of radicalic photoinitiator (DAROCURE 1173® Ciba Geigy) and 0.8 parts by weight of cationic photoinitiator (UVI-6990 CYRACURE® Union Carbide) were added to such solution.

0.2 parts by weight of colloidal silica having an acid pH (for instance HDK T 40, Wacker), 0.05 parts by weight of fluorinated surfactant (FLUORAD FC-430-3-M) were added always to such solution.

The formulation was polymerized with the same procedure of Example 1.

The crosslinked film showed an optimal adhesion and, after two days from the spraying and from crosslinking of such film, a pencil resistance of 7 H hardness (untreated PMMA hardness=HB), and an haze after the falling of two thousand grams of silicon carbide of 4.5% (untreated PPMA=11.5%).

The yellow index remained unchanged and the film did not show the presence of crazes.

EXAMPLE 3

A PMMA plate of a 3 mm thickness was coated by spreading with a layer of 10 μm of a mixture containing 50% of aliphatic urethane hexacrylate (EB 5129 UCB), 25% of trimethylol propane triacrylate, 10% of 2-hydroxy-ethylmethacrylate and 15% of triethylene glycol divinyl ether.

3 parts by weight of radicalic photoinitiator (DAROCURE 1173®, Ciba Geigy) and 1 part by weight of cationic photoinitiator (UVI-6990 CYRACURE® Union Carbide), are added to such solution.

The formulation was polymerized with the same procedure of Example 1.

The crosslinked film showed an optimal adhesion and, after two days from the spreading and from crosslinking of such film, a pencil hardness of 6 H hardness (untreated PMMA=HB), and an haze after the falling of two thousand grams of silicon carbide=6% (untreated PPMA=11.5%) and the film did not show the presence of crazes.

EXAMPLE 4

A PMMA plate having a 3 mm thickness was coated by spreading with a 10 μm layer with the same mixture as in Example 1.

In such a case high pressure mercury lamps HPK Philips 125 (about 25 W/cm) were adopted for crosslinking. The spreaded plate was put under such lamps for 10 minutes at a distance of 10 cm. No inhibition from the oxygen occurred and the adhesion values, pencil and abrasion resistance (mar resistance) are similar to those of Example 1 and the film does not show crazes.

COMPARATIVE EXAMPLE a) A PMMA plate of a 3 mm thickness was coated by spreading with a 10 μm layer of a mixture containing 75 parts by weight of trimethylolpropane triacrylate, 20 parts by weight of pentaerythrite triacrylate and 5 parts by weight of benzyldimethylketal (radicalic photoinitiator). 0.3% Of acid amorphous silica Syloid ED 30" (Grace Chemicals) were introduced into the mixture. The formulation was polymerized with the same procedure of Example 1.

The crosslinked film showed an optimal adhesion and after two days from the spreading and from the crosslinking of such film, a pencil hardness=7 H (untreated PMMA=HB) and an haze after the falling of 2000 g of silicon carbide= 4.5% (untreated PMMA=11.5%). The yellow index is higher than the one of an untreated PMMA plate (+0.8) and the presence of crazes in the film was noticed. b) the same coating was crosslinked with the procedure of example 4.

The film after 20 minutes was not yet crosslinked superficially due to inhibition from the oxygen.

We claim:

1. Process for preparing shaped articles having a surface, plates and films based on acrylic thermoplastic polymers, coated with an antiscratch and abrasionresistant film, consisting in applying on the surface of said article an homogeneous layer of a mixture comprising:

(A) from 55 to 95% by weight of a (meth)acrylic monomer and/or oligomer having at least two polymerizable double bonds, (B) from 5 to 25% by weight of monomers and/or oligomers of divinylethers, (C) from 0 to 20% by weight of monofunctional (meth)acrylic monomers, monofunctional (meth)acrylic oligomers, monofunctional monovinylethers, or mixtures thereof, said monomers, oligomers or monovinylethers having a polar group, (D) from 0.5 to 6 parts by weight for 100 parts of (A)+(B)+(C) of a radical photoinitiator, (E) from 0.1 to 3 parts by weight per 100 parts of (A)+(B)+(C) of a cationic photoinitiator, (F) from 0 to 8 parts by weight per 100 parts of (A)+(B)+(C) of colloidal silica or hydrophilic colloidal metal oxides, with the proviso that the sum of the amounts (A)+(B)+(C) is 100, and that when the component (A) or component (B) does not contain a polar group the component (C) is always present, and in submitting the article so coated to UV radiation at temperatures from 30° to 70° C.

2. Process according to claim 1, wherein the thermoplastic acrylic polymers of the article to be coated are copolymers of $C_1$–$C_4$ alkyl esters of (meth)acrylic acid or their mixtures with polyvinylchloride or polyvinylidenefluoride or with acrylic elastomers.

3. Process according to claim 1 wherein the thermoplastic acrylic polymer is polymethylmethacrylate.

4. Process according to claim 1 wherein component (A) is a monomer and/or oligomer of a polyfunctional (meth)acrylate, wherein said polyfunctional (meth)acrylate is polyfunctionalized with glycols, polyols, or aliphatic urethanes.

5. Process according to claim 1, wherein component (A) is selected from the group consisting of urethane poly(meth)acrylates, pentaerythrite triacrylate, pentaerythrite tetracrylate, dipentaerythrite pentacrylate, 1,6-hexanediol diacrylate and tripropyleneglycol diacrylate.

6. Process according to claim 1, wherein component (A) is aliphatic urethane hexacrylate, pentaerythrite triacrylate, or mixtures thereof, in admixture with trimethylolpropane triacrylate or 1,6-hexanediol diacrylate.

7. Process according to claim 1, wherein component (B) is selected from the group consisting of thyleneglycoldivinylether and 1,4-cyclohexane dimethanoldivinylether.

8. Process according to claim 1, wherein component (C) is selected from the group consisting of monovinylethers containing at least an hydroxyl or carboxyl group, hydroxyalkyl(meth)acrylates, and carboxyalkylmethacrylates.

9. Process according to claim 1, wherein component (C) is selected from the group consisting of 2-hydroxyethyl(meth)acrylate, 2-hydroxypropyl(meth)acrylate, 2-carboxyethylacrylate and butanediol monovinylether.

10. Process according to claim 1, wherein weight ratios of component (D):component(E) is at least 2:1.

11. Process according to claim 1, wherein the UV irradiation is carried out at temperatures from 40° to 60° C.

12. Process according to claim 1 wherein component (A) is a monomer and/or oligomer of a polyfunctional (meth)acrylate, wherein said polyfunctional (meth)acrylate is polyfunctionalized with ethoxylated polyols.

* * * * *